US011879997B2

United States Patent
Zweigle et al.

(10) Patent No.: US 11,879,997 B2
(45) Date of Patent: Jan. 23, 2024

(54) SYSTEM FOR SURFACE ANALYSIS AND METHOD THEREOF

(71) Applicant: FARO Technologies, Inc., Lake Mary, FL (US)

(72) Inventors: Oliver Zweigle, Stuttgart (DE); Aleksej Frank, Kornwestheim (DE); Johannes Buback, Korntal-Munchingen (DE)

(73) Assignee: FARO Technologies, Inc., Lake Mary, FL (US)

( * ) Notice: Subject to any disclaimer, the term of this patent is extended or adjusted under 35 U.S.C. 154(b) by 0 days.

(21) Appl. No.: 17/205,581

(22) Filed: Mar. 18, 2021

(65) Prior Publication Data
US 2021/0223368 A1     Jul. 22, 2021

Related U.S. Application Data

(62) Division of application No. 16/185,435, filed on Nov. 9, 2018, now Pat. No. 10,989,795.

(Continued)

(51) Int. Cl.
*G01S 7/481* (2006.01)
*G06T 7/521* (2017.01)
(Continued)

(52) U.S. Cl.
CPC .......... *G01S 7/4817* (2013.01); *G01B 11/005* (2013.01); *G01B 11/24* (2013.01);
(Continued)

(58) Field of Classification Search
CPC .......... G06T 7/543; G06T 7/55; G06T 7/564; G06T 7/60; G06T 7/62; G06T 7/64;
(Continued)

(56) References Cited

U.S. PATENT DOCUMENTS 6,330,523 B1 * 12/2001 Kacyra ................ G01B 11/002
703/2
7,843,448 B2     11/2010 Wheeler et al.
(Continued)

FOREIGN PATENT DOCUMENTS

WO     WO-2005088244 A1 *  9/2005 ........... B62D 57/024

OTHER PUBLICATIONS

Machine translation of WO 2005088244 A1. 27 pages. (Year: 2005).*

(Continued)

*Primary Examiner* — Gordon J Stock, Jr.
(74) *Attorney, Agent, or Firm* — McCarter & English, LLP; Dave S. Christensen; David K. Kincaid

(57) ABSTRACT

A system and method for analyzing a surface of an object is provided. The system includes a 3D measurement device operable to acquire a plurality of points on the surface of the object and determine 3D coordinates for each of the points. The system further includes processors operably coupled to the 3D measurement device. The processors are responsive to computer instructions when executed on the processors for performing a method comprising: generating a point cloud from the 3D coordinates of the plurality of points; extracting a first set of points from the plurality of points; defining a first reference geometry through the first set of points; measuring at least one first metric from each of the points in the first set of points to the first reference geometry; and identifying a nonconforming feature based at least in part on the at least one first metric.

15 Claims, 13 Drawing Sheets

Related U.S. Application Data

(60) Provisional application No. 62/589,126, filed on Nov. 21, 2017.

(51) Int. Cl.

| | | |
|---|---|---|
| *G06T 7/00* | (2017.01) | |
| *G06T 7/73* | (2017.01) | |
| *G01S 17/89* | (2020.01) | |
| *G01B 11/00* | (2006.01) | |
| *G01B 11/24* | (2006.01) | |
| *G01C 15/00* | (2006.01) | |
| *G01S 7/48* | (2006.01) | |
| *G01S 7/4865* | (2020.01) | |
| *G01S 7/51* | (2006.01) | |
| *G01S 17/08* | (2006.01) | |
| *G01B 11/26* | (2006.01) | |
| *G06T 17/05* | (2011.01) | |

(52) U.S. Cl.
CPC .......... *G01C 15/004* (2013.01); *G01S 7/4808* (2013.01); *G01S 7/4865* (2013.01); *G01S 7/51* (2013.01); *G01S 17/08* (2013.01); *G01S 17/89* (2013.01); *G06T 7/0004* (2013.01); *G06T 7/0008* (2013.01); *G06T 7/521* (2017.01); *G06T 7/73* (2017.01); *G01B 11/26* (2013.01); *G06T 17/05* (2013.01); *G06T 2207/10024* (2013.01); *G06T 2207/10028* (2013.01); *G06T 2207/20076* (2013.01)

(58) Field of Classification Search
CPC .... G06T 7/70; G06T 7/73; G06T 7/74; G06T 7/0002; G06T 7/0004; G06T 7/0008; G06T 7/001; G06T 7/10; G06T 7/11; G06T 7/12; G06T 7/13; G06T 7/136; G06T 7/50; G06T 7/521; G06T 2207/10024; G06T 2207/10028; G06T 2207/20076; G01C 15/004; G01S 7/4808; G01S 7/4817; G01S 7/4865; G01S 7/51; G01S 17/02; G01S 17/05; G01S 17/06; G01S 17/08; G01S 17/42; G01S 17/46; G01S 17/88; G01S 17/89; G01B 11/002; G01B 11/005; G01B 11/22; G01B 11/24; G01B 11/2518; G01B 11/2522; G01B 11/26; G01B 11/28; G01B 11/30; G01B 11/303; G01B 11/306; G01B 11/16; G01B 11/167; G01N 21/88; G01N 21/8803; G01N 21/8806; G01N 21/8851; G01N 21/95; G01N 21/9515; G01N 21/956; G01N 21/95607; G01N 2021/8861; G01N 2021/8887; G01N 2021/9518

See application file for complete search history.

(56) References Cited

U.S. PATENT DOCUMENTS

| | | | |
|---|---|---|---|
| 8,047,847 B2 | 11/2011 | Kaufmann et al. | |
| 8,437,535 B2 | 5/2013 | Boca et al. | |
| 8,705,012 B2 | 4/2014 | Greiner et al. | |
| 8,718,393 B2 | 5/2014 | Chen et al. | |
| 8,756,085 B1* | 6/2014 | Plummer | G06T 7/187 |
| | | | 705/40 |
| 9,013,469 B2 | 4/2015 | Bendall | |
| 9,053,547 B2* | 6/2015 | Kitamura | G01B 11/24 |
| 9,098,773 B2 | 8/2015 | Huang et al. | |
| 9,280,825 B2* | 3/2016 | Huang | G16H 40/63 |
| 9,372,265 B2* | 6/2016 | Zweigle | G09B 29/004 |
| 9,436,987 B2 | 9/2016 | Ding et al. | |
| 9,508,186 B2* | 11/2016 | Poelman | G06T 15/405 |
| 9,799,111 B2* | 10/2017 | Zheng | G06T 7/62 |
| 9,824,453 B1 | 11/2017 | Collins et al. | |
| 10,074,160 B2 | 9/2018 | Kim et al. | |
| 10,319,094 B1 | 6/2019 | Chen et al. | |
| 10,837,916 B2 | 11/2020 | Haynes | |
| 10,989,795 B2* | 4/2021 | Zweigle | G01S 7/51 |
| 2012/0256916 A1* | 10/2012 | Kitamura | G01S 17/89 |
| | | | 345/419 |
| 2013/0121564 A1* | 5/2013 | Kitamura | G01S 17/42 |
| | | | 382/154 |
| 2013/0181983 A1* | 7/2013 | Kitamura | G06T 17/10 |
| | | | 345/419 |
| 2014/0078519 A1* | 3/2014 | Steffey | G01S 7/4817 |
| | | | 356/625 |
| 2015/0160343 A1 | 6/2015 | Zweigle et al. | |
| 2015/0170412 A1* | 6/2015 | Bendall | G01B 13/22 |
| | | | 382/119 |
| 2015/0226840 A1* | 8/2015 | Becker | G01S 7/4808 |
| | | | 356/5.01 |
| 2015/0323672 A1 | 11/2015 | Shenkar et al. | |
| 2016/0264262 A1 | 9/2016 | Colin et al. | |
| 2016/0327383 A1 | 11/2016 | Becker et al. | |
| 2017/0264880 A1 | 9/2017 | Zolotov | |
| 2018/0315168 A1* | 11/2018 | Kim | G06T 13/40 |
| 2018/0322623 A1 | 11/2018 | Memo et al. | |
| 2018/0330149 A1 | 11/2018 | Uhlenbrock et al. | |
| 2019/0154806 A1 | 5/2019 | Zweigle et al. | |
| 2020/0167940 A1* | 5/2020 | Kosaka | G06T 7/136 |

OTHER PUBLICATIONS

Gunji, Naoyuki et al., "3D Object Recognition from large-scale point clouds with global descriptor and sliding window," 2016 23rd International Conference on Pattern Recognition (ICPR) Cancun Center, Cancun, Mexico, Dec. 4-8, 2016, pp. 721-726. (Year: 2016).*

Jovancevic, Igor et al., "Automated visual inspection of an airplane exterior," Proc. SPIE 9534, Twelfth International Conference on Quality Control by Artificial Vision 2015, 95340Y (Apr. 30, 2015), pp. 95340Y-1 to 95340Y-9. (Year: 2015).*

Jovancevic, Igor et al., "Automated exterior inspection of an aircraft with a pan-tilt-zoom camera mounted on a mobile robot," Nov./Dec. 2015, Journal of Electronic Imaging 24(6), pp. 061110-1 to 061110-15. (Year: 2015).*

Jovancevic, Igor. Exterior inspection of an aircraft using a Pan-Tilt-Zoom camera and a 3D scanner moved by a mobile robot : 2D image processing and 3D point cloud analysis. Optics/Photonic. Ecole des Mines d'Albi-Carmaux, 2016. English. NNT: 2016 EMAC0023. tel-01687831, pp. 1-215. (Year: 2016).*

Tang, Pingbo et al., "Characterization of three algorithms for detecting surface flatness defects from dense point clouds," Proc. SPIE 7239, Three-Dimensional Imaging Metrology, 72390N (Jan. 19, 2009), pp. 72390N-1 to 72390N-12. (Year: 2009).*

Chen et al.; "Application of Optical Inspection and Metrology in Quality Control for Aircraft Components"; Computer Engineering and Technology (ICCET); 2010 2nd International Conference; IEEE; Apr. 16, 2010; pp. V5-294.

Kim et al.; "A Framework for Dimensional and Surface Quality Assessment of Precast Concrete Elements Using BIM and 3D Laser Scanning"; Automation in Construction; vol. 49; Aug. 10, 2014; pp. 225-238.

Park et al.; "Robust Inspection Technique for Detection of Flatness Defect of Oil Pans"; International Journal of Automotive Technology; The Korean Society of Automotive Engineers; vol. 17, No. 1; Feb. 6, 2016; pp. 119-126.

\* cited by examiner

SYSTEM FOR SURFACE ANALYSIS AND METHOD THEREOF

CROSS REFERENCE TO RELATED APPLICATIONS

This application is a divisional of U.S. patent application Ser. No. 16/185,435, filed Nov. 9, 2018, which claims the benefit of U.S. Provisional Application Ser. No. 62/589,126, filed Nov. 21, 2017, the entire disclosure of which is incorporated herein by reference.

BACKGROUND

The present application is directed to a system analyzing a surface of an object, and in particular for analyzing a surface without access to a computer-aided-design (CAD) model.

A 3D laser scanner time-of-flight (TOF) coordinate measurement device is a type of metrology device that is used for determining coordinates of surfaces of an object. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the scanner image. To generate a color scanner image, at least three positional coordinates (such as x, y, z) and three color values (such as red, green, blue "RGB") are collected for each data point.

A 3D image of a scene may require multiple scans from different registration positions. The overlapping scans are registered in a joint coordinate system. Such registration is performed by matching targets in overlapping regions of the multiple scans. The targets may be artificial targets such as spheres or checkerboards or they may be natural features such as corners or edges of walls. Some registration procedures involve relatively time-consuming manual procedures such as identifying by a user each target and matching the targets obtained by the scanner in each of the different registration positions. Some registration procedures also require establishing an external "control network" of registration targets measured by an external device such as a total station.

In some applications, once an object is scanned and the registration completed, the point cloud is then analyzed or inspected to determine if parameters are out of specification or are otherwise nonconforming. It should be appreciated that manually analyzing the point cloud could be a slow and tedious process. Attempts at automating the analysis of the point cloud typically focus on comparing the point cloud to an electronic model of the object being measured, such as a computer-aided-design (CAD) model. First the CAD model and the point cloud are aligned. Next, a comparison of the point cloud to the CAD model is performed and deviations are highlighted. In some instances, the deviations are noted based on a predetermined tolerance. In still other instances predetermined attributes, such as dimensions for example, are identified by the operator prior to the comparison.

While the use of a CAD model for comparison with the point cloud allows for some inspection of the object being measured, CAD models for objects are not always available. For example, when the measurements are being performed by a third party, in other words someone other than the manufacturer of the object, the proprietary CAD model may not be available. Third parties that may be interested in measuring objects include insurance companies looking to estimate damage or airlines in inspecting airplanes for example.

Accordingly, while existing systems for measuring and analyzing surfaces are suitable for their intended purposes, what is needed is a system having certain features of embodiments of the present invention.

BRIEF DESCRIPTION

According to one aspect of the invention, a system for analyzing a surface of an object is provided. The system includes a three-dimensional (3D) measurement device operable to acquire a plurality of points on the surface of the object and determine 3D coordinates for each of the plurality of points. The system further includes one or more processors operably coupled to the 3D measurement device. The one or more processors are responsive to executable computer instructions when executed on the one or more processors for performing a method comprising: generating a point cloud from the 3D coordinates of the plurality of points; extracting a first set of points from the plurality of points; defining a first reference geometry through the first set of points; measuring at least one first metric from each of the points in the first set of points to the first reference geometry; and identifying a nonconforming feature based at least in part on the at least one first metric.

In addition to one or more of the features described herein, or as an alternative, further embodiments of the system may include the method transmitting a signal when the distance exceeds a predetermined threshold. In addition to one or more of the features described herein, or as an alternative, further embodiments of the system may include the method segmenting surfaces in the point cloud into a set of surfaces based on edges of the object. In addition to one or more of the features described herein, or as an alternative, further embodiments of the system may include the method defining an area of interest, the first set of points being disposed within the area of interest, and moving the area of interest over each surface in the set of surfaces, wherein for each movement of the area of interest a second set of points is extracted from the plurality of points, a second reference geometry is fit through the second set of points, a second metric is measured from each of the points in the set of points to the reference geometry, and a nonconforming feature is identified based at least in part on the second metric.

In addition to one or more of the features described herein, or as an alternative, further embodiments of the system may include the first reference geometry being a first plane, and the second reference geometry being a second plane. In addition to one or more of the features described herein, or as an alternative, further embodiments of the system may include the at least one first metric being a first distance from the first plane to each of the points in the set of points, and the second metric being a second distance from the second plane to each of the points in the set of points. In addition to one or more of the features described herein, or as an alternative, further embodiments of the system may include the first distance and second distance being determined along a vector normal to the first plane and the second plane.

In addition to one or more of the features described herein, or as an alternative, further embodiments of the system may include a mobile platform, wherein the 3D measurement device is coupled to the mobile platform. In addition to one or more of the features described herein, or as an alternative, further embodiments of the system may include the mobile platform being operable to autonomously move along a predetermined path.

In addition to one or more of the features described herein, or as an alternative, further embodiments of the system may include a mobile computing device, the mobile computing device having one or more second processors responsive to executable computer instructions when executed on the one or more second processors, the one or more second processors being responsive to execute a method comprising: displaying a graphical representation of the object on a user interface; identifying locations relative to the object to performs measurements with the 3D measurement device in response to an input from an operator; and transmitting the locations to the one or more processors.

In addition to one or more of the features described herein, or as an alternative, further embodiments of the system may include the mobile computing device further having a 3D camera operable to measure a depth to a surface from the mobile computing device. In addition to one or more of the features described herein, or as an alternative, further embodiments of the system may include the one or more second processors are further responsive to execute a method comprising: acquiring a plurality of images of the object with the 3D camera; and generating the graphical representation of the object based at least in part on the plurality of images. In addition to one or more of the features described herein, or as an alternative, further embodiments of the system may include the nonconforming feature being at least one of a dent, a bump, or a missing fastener.

In a further aspect of the invention, a method of analyzing a surface of an object is provided. The method includes performing a scan of the object with a 3D measurement device, the 3D measurement device being operable to measure 3D coordinates for a plurality of points on the surface. A point cloud is generated from the 3D coordinates of the plurality of points. A first set of points are extracted from the plurality of points. A first reference geometry is defined through the first set of points. At least one first metric is measured from each of the points in the first set of points to the first reference geometry. A nonconforming feature is identified based at least in part on the at least one first metric.

In addition to one or more of the features described herein, or as an alternative, further embodiments of the method may include segmenting surfaces in the point cloud into a set of surfaces based on edges of the object. In addition to one or more of the features described herein, or as an alternative, further embodiments of the method may include defining an area of interest, the first set of points being disposed within the area of interest. In addition to one or more of the features described herein, or as an alternative, further embodiments of the method may include moving the area of interest over each surface in the set of surfaces, wherein for each movement of the area of interest a second set of points is extracted from the plurality of points, a second reference geometry is fit through the second set of points, a second metric is measured from each of the points in the set of points to the reference geometry, and a nonconforming feature is identified based at least in part on the second metric.

In addition to one or more of the features described herein, or as an alternative, further embodiments of the method may include moving the 3D measurement device about the object, and performing a plurality of scans as the 3D measurement device is moved about the object. In addition to one or more of the features described herein, or as an alternative, further embodiments of the method may include the 3D measurement device being moved by an autonomous mobile platform. In addition to one or more of the features described herein, or as an alternative, further embodiments of the method may include displaying a graphical representation of the object on a user interface, identifying locations to perform each of the plurality of scans relative to the object in response to an input from an operator, and transmitting the locations to the autonomous mobile platform.

In addition to one or more of the features described herein, or as an alternative, further embodiments of the method may include acquiring a plurality of images using a 3D camera, each of the plurality of images including depth information, and generating the graphical representation of the object based at least in part on the plurality of images. In addition to one or more of the features described herein, or as an alternative, further embodiments of the method may include the identified the nonconforming feature being at least one of a dent, a bump or a missing fastener. In addition to one or more of the features described herein, or as an alternative, further embodiments of the method may include displaying the point cloud on the user interface, and changing a color of the point cloud at a location of the nonconforming feature.

In addition to one or more of the features described herein, or as an alternative, further embodiments of the method may include the first reference geometry is a plane, and the at least one first metric is a distance from the plane to from each of the points in the first set of points. In addition to one or more of the features described herein, or as an alternative, further embodiments of the method may include the distance being determined along a vector normal to the plane.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention relates to a system for analyzing a surface of an object. Some embodiments provide advantages in providing a system that allows for analyzing the surface of an object of damage or nonconforming fabrication using a 3D measurement device mounted on an autonomous mobile platform. Further embodiments provide advantages in providing a system that allows for the analyzing the surface of an object of damage or nonconforming fabrication without comparison to an electronic model, such as a CAD model.

Figure 1:
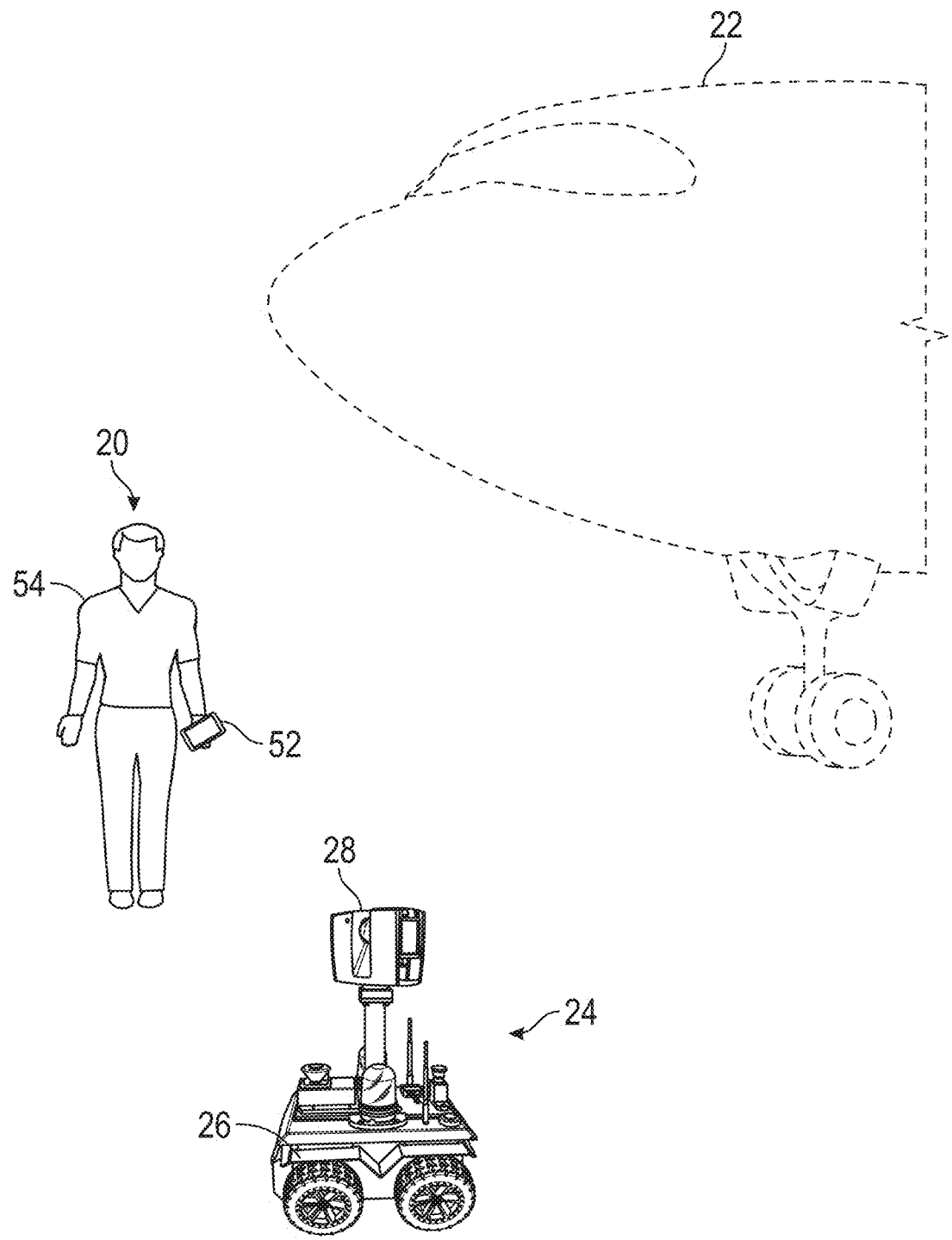
FIG. 1 is a schematic illustration of a system for analyzing surfaces in accordance with an embodiment of the invention.
Figure 2:
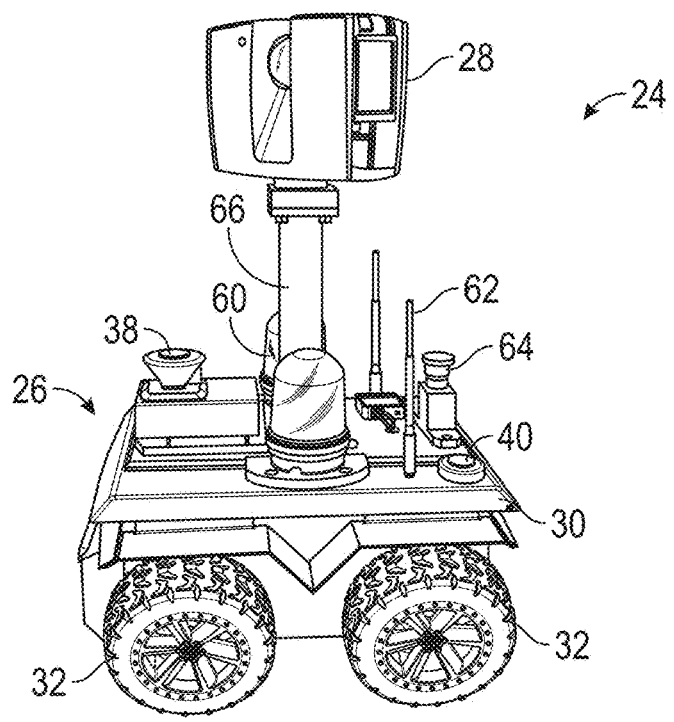
FIG. 2 is a perspective view of an autonomous mobile three-dimensional (3D) measurement device according to an embodiment.
Figure 3:
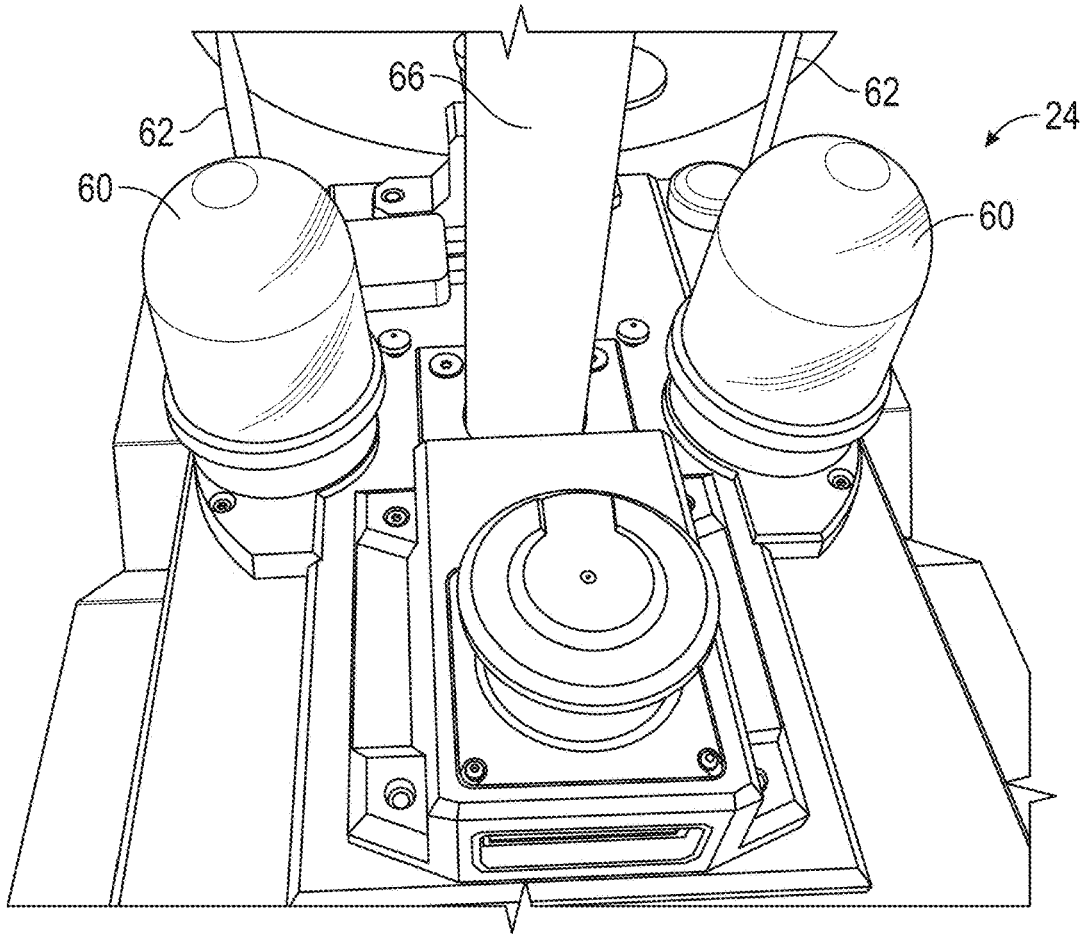
FIG. 3 is a partial top perspective view of the mobile 3D measurement device of FIG. 2 according to an embodiment.
Figure 4:
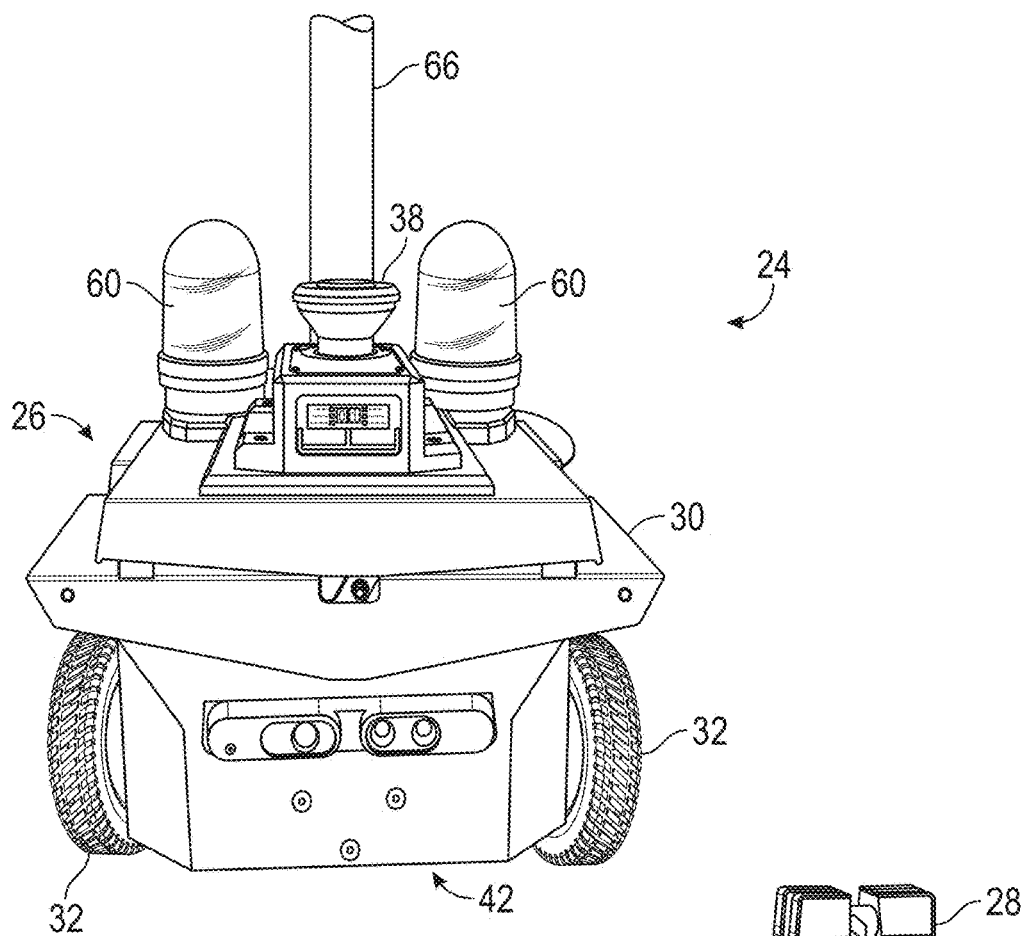
FIG. 4 a front perspective view of the mobile 3D measurement device of FIG. 2 according to an embodiment.
Figure 5:
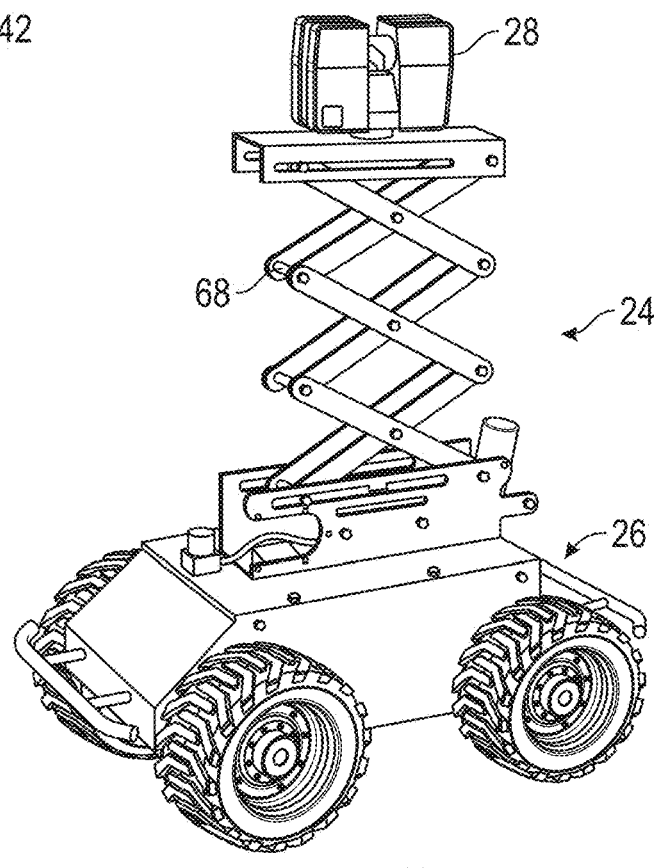
FIG. 5 is an autonomous mobile 3D measurement device according to another embodiment.

Referring now to FIG. 1, an embodiment is shown of a system 20 for analyzing surfaces of an object, such as airplane 22 for example. It should be appreciated that while embodiments herein may refer to the object as being an airplane 22, this is for exemplary purposes. In other embodiments, other objects may be inspected, such as but not limited to automobiles, trucks, boats, ships, and bridges for example. In the exemplary embodiment, the system 20 includes a mobile 3D measurement system 24 that is comprised of a mobile platform 26 and an integral 3D measurement device 28. As will be discussed in more detail herein, the mobile platform 26 may be an autonomously operated vehicle that moves along a predetermined route to perform a plurality of scans. The 3D coordinates of points on the surface from these plurality of scans may be used to generate a point cloud of the object.

It should be appreciated that while the exemplary embodiment describes the surface analysis with respect to a measurement system 24 having a mobile platform 26, this is for exemplary purposes and the claims should not be so limited. In other embodiments, the surface analysis may be performed from a single scan by a 3D measurement system, such as a laser scanner for example, that is performed at a single location.

Referring now to FIGS. 2-5 and FIG. 9, an embodiment is shown of the 3D measurement system 24. In this embodiment, the mobile platform 26 includes a body 30 and a plurality of wheels 32. The wheels 32 are driven by one or more motors 34. A steering mechanism 36 is coupled to at least two of the wheels 32 to allow the changing of direction of mobile platform 26. Mounted on the body 30 are a plurality of sensors 38, 40, 42 that provide input to a controller or processor 44. In an embodiment, the sensor input is used by the processor 44 to identify obstacles in the area about the mobile platform 26 and allow the processor 44 to change the speed or direction of the mobile platform 26 to avoid contact with an obstacle or a person. In an embodiment, the processor 44, controls the motor 34 and steering mechanism 36 and can operate autonomously along a predetermined route.

Processor 44 is a suitable electronic device capable of accepting data and instructions, executing the instructions to process the data. Controller 44 may accept instructions through user interface, or through other means such as but not limited to electronic data card, voice activation means, manually-operable selection and control means, radiated wavelength and electronic or electrical transfer.

In general, processor 44 accepts data from sensors 38, 40, 42 and is given certain instructions for the purpose of comparing the data from sensors 38, 40, 42 to predetermined operational parameters. Processor 44 provides operating signals to the motor 34 and steering mechanism 36. Processor 44 also accepts data from sensors 38, 40, 42, indicating, for example, whether an obstacle. The controller 38 compares the operational parameters to predetermined variances (e.g. probability of contact) and if the predetermined variance is exceeded, generates a signal that may be used to indicate an alarm to an operator or the computer network 42. Additionally, the signal may initiate other control methods that adapt the operation of the 3D measurement system 24 such as changing the direction or speed of the mobile platform 26 to compensate for the out of variance operating parameter. The signal may also initiate other control methods that initiate operation of the 3D measurement device 28 when a predetermined location has been reached.

Processor 44 may also be coupled to external computer networks such as a local area network (LAN) 46 and the Internet via a communications circuit or module 50. LAN 46 interconnects one or more remote computers 48, which are configured to communicate with controller 38 using a well-known computer communications protocol such as TCP/IP (Transmission Control Protocol/Internet(^) Protocol), RS-232, ModBus, and the like. Additional systems 24 may also be connected to LAN 46 with the processors 44 in each of these systems 24 being configured to send and receive data to and from remote computers 48 and other systems 24. LAN 46 may also be connected to the Internet. This connection allows processor 44 to communicate with one or more remote computers 48 connected to the Internet. It should be appreciated that communications module 50 also allows communication between the 3D measurement system 24 and a mobile computing device 52 carried by an operator 54. The communications medium between the 3D measurement system 24 and the mobile computing device 52 may be via the network 46, or a direct wireless connection (e.g. Bluetooth, RFID)

The processor 44 is further coupled to one or more memory devices 56 and an input/output (I/O) controller 58. The memory devices 56 may include one or more random access memory devices, non-volatile memory devices or read-only memory devices.

It should be appreciated that the mobile platform 26 may include additional devices, such as but not limited to lights 60, antennas 62 and stop actuators 64 that are mounted to the body 30 as is known in the art. In an embodiment, a post 66 extends from a central area of the top of the body 30. The 3D measurement system 28 is mounted to an end of the post 66 opposite the body 30. In an embodiment, the post 66 is of a fixed length such that the 3D measurement system 28 performs scans at a uniform height from the ground. In another embodiment shown in FIG. 5, the post is a scissor lift 68 that is controllable by the processor 44 to change the height of the 3D measurement system 28 based on the environment in which the system 20 is operating.

In an embodiment, the 3D measurement device 28 is a time-of-flight laser scanner. It should be appreciated that while embodiments disclosed herein may refer to a laser scanner, the claims should not be so limited. In other embodiments, the 3D measurement device 28 may be any device capable of measuring 3D coordinates with a desired level of accuracy, such as but not limited to a triangulation scanner, a structured light scanner, a photogrammetry system, a videogrammetry system or a panoramic camera system for example.

Figure 6:
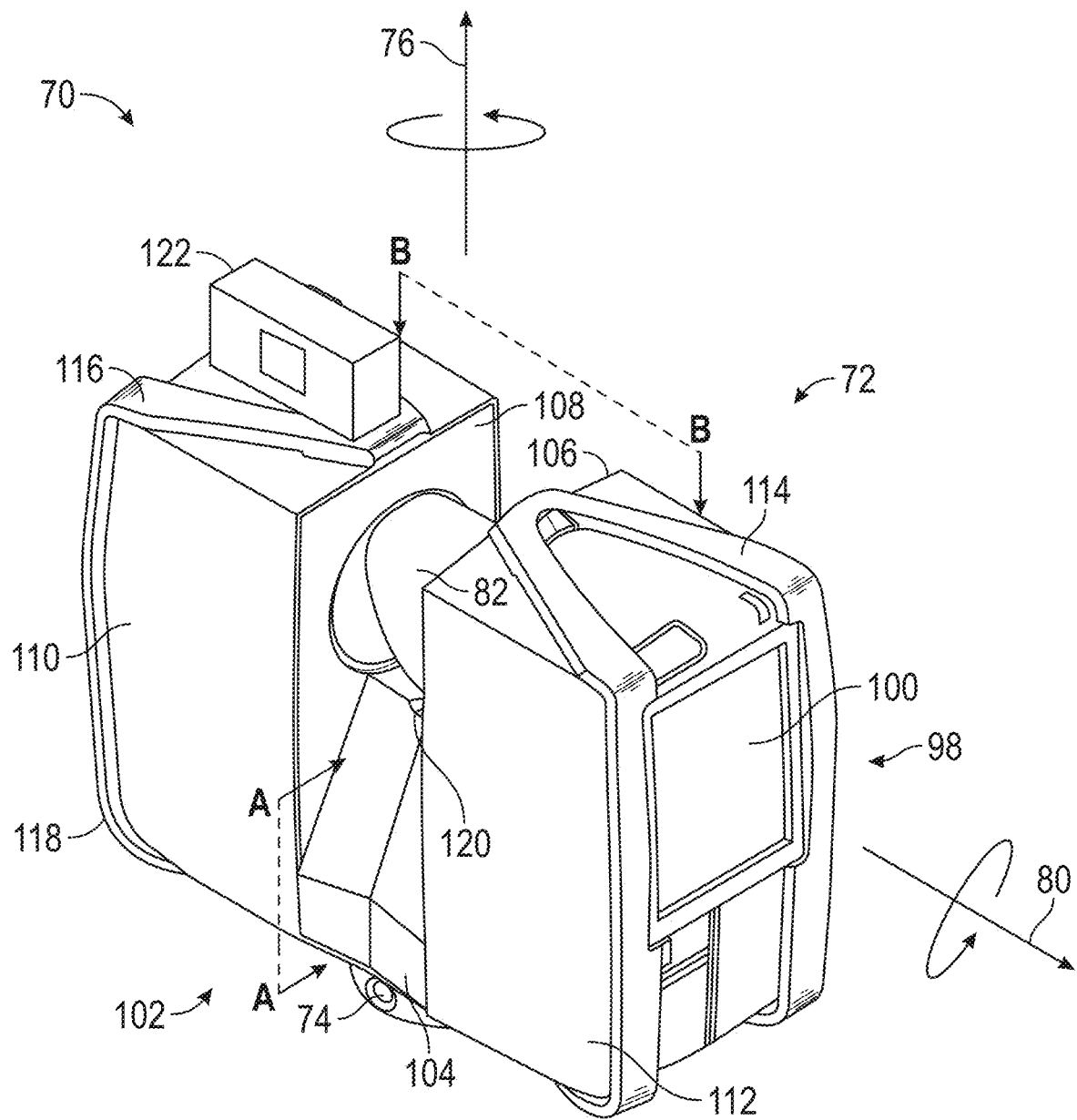
FIG. 6, FIG. 7 and FIG. 8 illustrate a laser scanner device for use with the mobile 3D measurement device of FIG. 2 according to an embodiment.
Figure 7:
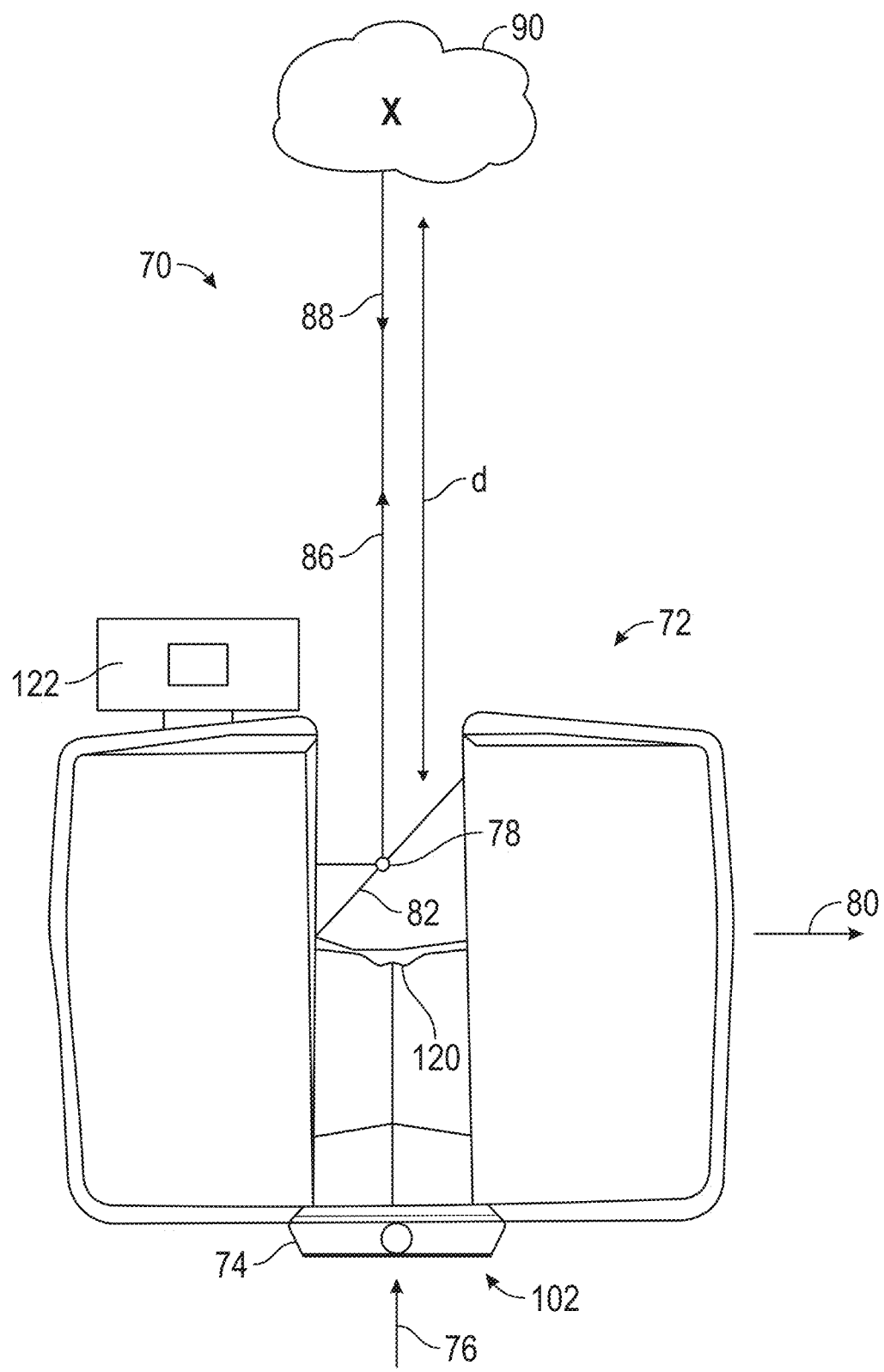
Figure 8:
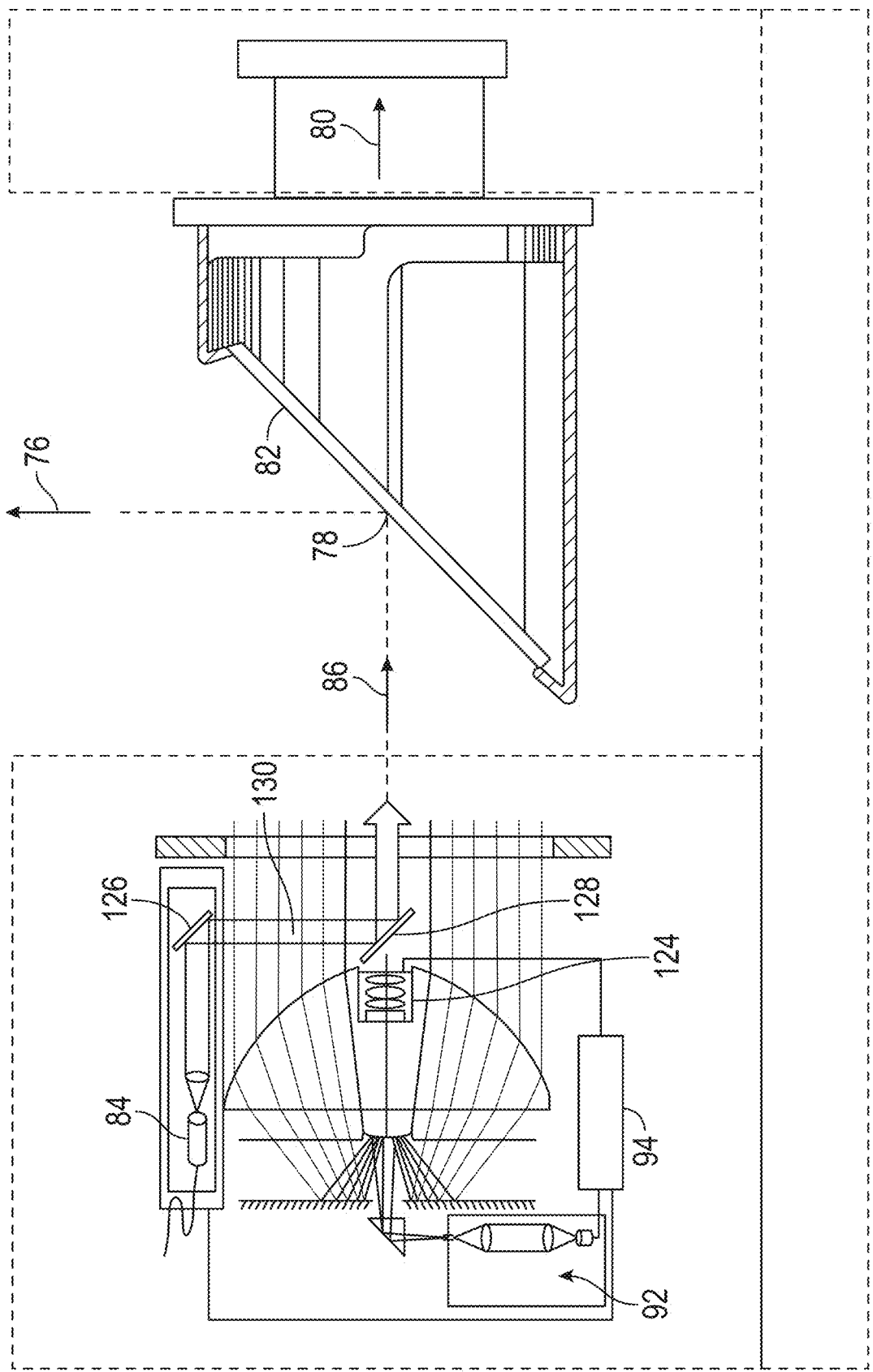

Referring now to FIGS. 6-8, an embodiment of a laser scanner 70 is shown for optically scanning and measuring the environment surrounding the laser scanner 70. The laser scanner 70 has a measuring head 72 and a base 74. The measuring head 72 is mounted on the base 74 such that the laser scanner 70 may be rotated about a vertical axis 76. In one embodiment, the measuring head 72 includes a gimbal point 78 that is a center of rotation about the vertical axis 76 and a horizontal axis 80. The measuring head 72 has a rotary mirror 82, which may be rotated about the horizontal axis 80. The rotation about the vertical axis may be about the center of the base 74. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 72 is further provided with an electromagnetic radiation emitter, such as light emitter 84, for example, that emits an emitted light beam 86. In one embodiment, the emitted light beam 86 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 86 is emitted by the light emitter 84 onto the rotary mirror 82, where it is deflected to the environment. A reflected light beam 88 is reflected from the environment by an object 90. The reflected or scattered light is intercepted by the rotary mirror 82 and directed into a light receiver 92. The directions of the emitted light beam 86 and the reflected light beam 88 result from the angular positions of the rotary mirror 82 and the measuring head 72 about the axes 76, 80. These angular positions in turn depend on movement generated by corresponding rotary drives or motors.

Coupled to the light emitter 84 and the light receiver 92 is a controller 94. The controller 94 determines, for a multitude of measuring points X, a corresponding number of distances d between the laser scanner 70 and the points X on 90. The distance to a particular point X is determined based at least in part on the speed of light in air through which electromagnetic radiation propagates from the device to the object point X. In one embodiment the phase shift of modulation in light emitted by the laser scanner 70 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 70 takes place by rotating the rotary mirror 82 relatively quickly about axis 80 while rotating the measuring head 72 relatively slowly about axis 76, thereby moving the assembly in a spiral pattern. In an exemplary embodiment, the rotary mirror rotates at a maximum speed of 5820 revolutions per minute. For such a scan, the gimbal point 78 defines the origin of the local stationary reference system. The base 74 rests in this local stationary reference system.

In addition to measuring a distance d from the gimbal point 78 to an object point X, the scanner 70 may also collect gray-scale information related to the received optical power (equivalent to the term "brightness.") The gray-scale value may be determined at least in part, for example, by integration of the bandpass-filtered and amplified signal in the light receiver 92 over a measuring period attributed to the object point X.

The measuring head 72 may include a display device 98 integrated into the laser scanner 70. The display device 98 may include a graphical touch screen 100, as shown in FIG. 6, which allows the operator to set the parameters or initiate the operation of the laser scanner 70. For example, the screen 100 may have a user interface that allows the operator to provide measurement instructions to the device, and the screen may also display measurement results. In an embodiment, the screen 100 also provides a user interface to allow the operator to interact, configure and initiate operation of the mobile platform 26 as well.

In an embodiment, the laser scanner 70 includes a carrying structure 102 that provides a frame for the measuring head 72 and a platform for attaching the components of the laser scanner 70. In one embodiment, the carrying structure 102 is made from a metal such as aluminum. The carrying structure 102 includes a traverse member 104 having a pair of walls 106, 108 on opposing ends. The walls 106, 108 are parallel to each other and extend in a direction opposite the base 74. Shells 50, 52 are coupled to the walls 106, 108 and cover the components of the laser scanner 70. In the exemplary embodiment, the shells 110, 112 are made from a plastic material, such as polycarbonate or polyethylene for example. The shells 110, 112 cooperate with the walls 106, 108 to form a housing for the laser scanner 70.

On an end of the shells 110, 112 opposite the walls 106, 108 a pair of yokes 114, 116 are arranged to partially cover the respective shells 110, 112. In the exemplary embodiment, the yokes 114, 116 are made from a suitably durable material, such as aluminum for example, that assists in protecting the shells 110, 112 during transport and operation. The yokes 114, 116 each includes a first arm portion 118 that is coupled, such as with a fastener for example, to the traverse 104 adjacent the base 74. The arm portion 118 for each yoke 114, 116 extends from the traverse 104 obliquely to an outer corner of the respective shell 110, 112. From the outer corner of the shell, the yokes 114, 116 extend along the side edge of the shell to an opposite outer corner of the shell. Each yoke 114, 116 further includes a second arm portion that extends obliquely to the walls 106, 108. It should be appreciated that the yokes 114, 116 may be coupled to the traverse 102, the walls 106, 108 and the shells 110, 112 at multiple locations.

The pair of yokes 114, 116 cooperate to circumscribe a convex space within which the two shells 110, 112 are arranged. In the exemplary embodiment, the yokes 114, 116 cooperate to cover all of the outer edges of the shells 110, 112, while the top and bottom arm portions project over at least a portion of the top and bottom edges of the shells 110, 112. This provides advantages in protecting the shells 110, 112 and the measuring head 72 from damage during transportation and operation. In other embodiments, the yokes 114, 116 may include additional features, such as handles to facilitate the carrying of the laser scanner 70 or attachment points for accessories for example.

On top of the traverse 104, a prism 120 is provided. The prism extends parallel to the walls 106, 108. In the exemplary embodiment, the prism 120 is integrally formed as part of the carrying structure 102. In other embodiments, the prism 120 is a separate component that is coupled to the traverse 104. When the mirror 78 rotates, during each rotation the mirror 78 directs the emitted light beam 86 onto the traverse 104 and the prism 120. Due to non-linearities in the electronic components, for example in the light receiver 92, the measured distances d may depend on signal strength, which may be measured in optical power entering the scanner or optical power entering optical detectors within the light receiver 92, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 92. Since the prism 120 is at a known distance from the gimbal point 78, the measured optical power level of light reflected by the prism 120 may be used to correct distance measurements for other measured points, thereby allowing for compensation to correct for the effects of environmental variables such as temperature. In the exemplary embodiment, the resulting correction of distance is performed by the controller 94.

In an embodiment, the base 74 is coupled to a swivel assembly (not shown) such as that described in commonly owned U.S. Pat. No. 8,705,012 ('012), which is incorporated by reference herein. The swivel assembly is housed within the carrying structure 102 and includes a motor that is configured to rotate the measuring head 72 about the axis 76.

In an embodiment, an auxiliary image acquisition device 122 may be a device that captures and measures a parameter associated with the scanned volume or the scanned object and provides a signal representing the measured quantities over an image acquisition area. The auxiliary image acquisition device 122 may be, but is not limited to, a pyrometer, a thermal imager, an ionizing radiation detector, or a millimeter-wave detector. In an embodiment, the auxiliary image acquisition device 122 is a color camera.

In an embodiment, a central color camera (first image acquisition device) 124 is located internally to the scanner and may have the same optical axis as the 3D scanner device. In this embodiment, the first image acquisition device 124 is integrated into the measuring head 72 and arranged to acquire images along the same optical pathway as emitted light beam 86 and reflected light beam 88. In this embodiment, the light from the light emitter 84 reflects off a fixed mirror 126 and travels to dichroic beam-splitter 128 that reflects the light 130 from the light emitter 84 onto the rotary mirror 82. The dichroic beam-splitter 128 allows light to pass through at wavelengths different than the wavelength of light 130. For example, the light emitter 84 may be a near infrared laser light (for example, light at wavelengths of 780 nm or 1150 nm), with the dichroic beam-splitter 128 configured to reflect the infrared laser light while allowing visible light (e.g., wavelengths of 400 to 700 nm) to transmit through. In other embodiments, the determination of whether the light passes through the beam-splitter 128 or is reflected depends on the polarization of the light. The digital camera 124 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 76 and by steering the mirror 82 about the axis 80.

Figure 9:
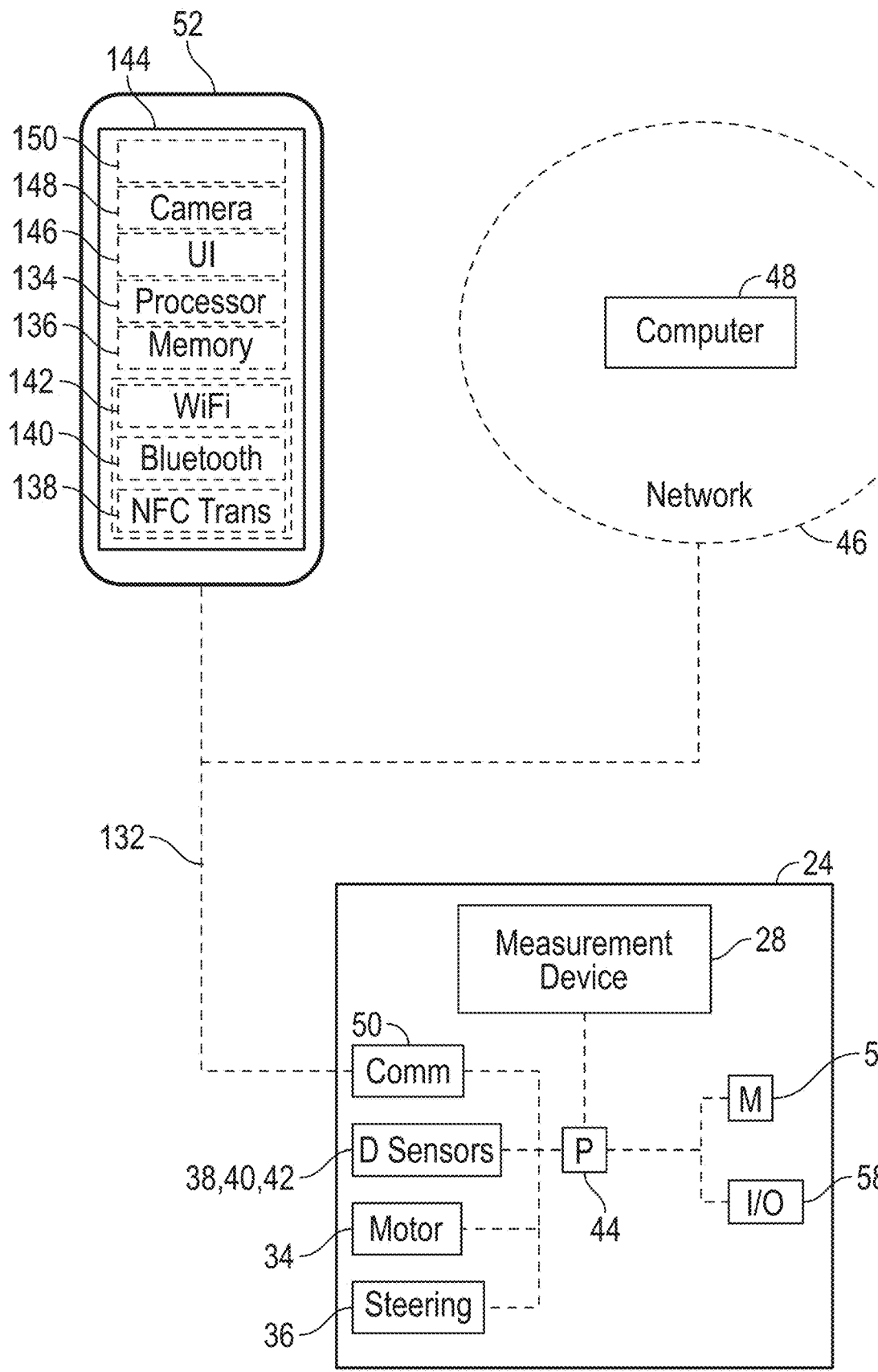
FIG. 9 illustrates a schematic block diagram of the system of FIG. 1 according to an embodiment.

Referring now to FIG. 9, an embodiment is shown of the system 20. As discussed above, the measurement system 24 includes a communications module 50 that allows the measurement system 24 to transmit to and receive data from the network 46 via a communications medium 132. The communications medium 132 may be a wireless (e.g. WiFi or radio frequency communications) or a wired (e.g. Ethernet). It should be appreciated that the communications medium 132 may also allow direct communications between the mobile computing device 52 and the measurement system 24, such as a wireless communications protocol such as Bluetooth™ provided by Bluetooth SIG, Inc for example.

The mobile computing device 52 includes a processor 134 and memory 136. The processor 134 is responsive to executable computer instructions and performs functions or control methods, such as those illustrated in FIGS. 10-18. The processors may be microprocessors, field programmable gate arrays (FPGAs), digital signal processors (DSPs), and generally any device capable of performing computing functions. The one or more processors have access to memory for storing information. The memory 136 may include random access memory (RAM) or read-only memory (ROM) for example, for storing application code that is executed on the processor 134 and storing data, such as coordinate data for example. The mobile computing device 52 further includes communications circuits, such as near field communications (ISO 14443) circuit 138, Bluetooth™ (IEEE 802.15.1 or its successors) circuit 140 and WiFi (IEEE 802.11) circuit 142 for example. The communications circuits 138, 140, 142 are transceivers, meaning each is capable of transmitting and receiving signals. It should be appreciated that the cellular phone may include additional components and circuits, such as a cellular communications circuit, as is known in the art.

In the exemplary embodiment, the mobile computing device 52 includes a display 144 that presents a graphical user interface (GUI) 146 to the user. In one embodiment, the GUI 146 allows the user to view data, such as measured coordinate data for example, and interact with the mobile computing device 52. In one embodiment, the display 144 is a touch screen device that allows the user to input information and control the operation of the mobile computing device 52 using their fingers.

In an embodiment, the mobile computing device 52 may include one or more cameras 148. In an embodiment, at least one of the cameras 148 is a depth-camera such as an RGBD type camera which acquires depth information in addition to visual information on a per-pixel basis. The depth-camera data may be sent to the processor system through wired or wireless communication channels. As will be discussed in more detail herein, the depth-camera 148 may be used to perform a preliminary mapping of the area and object to be scanned. This allows for map planning of the route traversed by the measurement device 24.

In an embodiment, the depth-camera 148 may be include one of two types: a central-element depth camera and a triangulation-based depth camera. A central-element depth camera uses a single integrated sensor element combined with an illumination element to determine distance ("depth") and angles from the camera to points on an object. One type of central-element depth camera uses a lens combined with a semiconductor chip to measure round-trip time of light travelling from the camera to the object and back. For example, the Microsoft Xbox™ One manufactured by Microsoft Corporation of Redmond, WA includes a Kinect depth camera that uses an infrared (IR) light source to illuminate a 640×480 pixel photosensitive array. This depth camera is used in parallel with a 640×480 pixel RGB camera that measures red, blue, and green colors. Infrared illumination is provided in the IR illuminators adjacent to the lens and IR array. Another example of a central-element depth camera includes a lens and a Model PhotonICs 19k-S3 3D chip manufactured by PMD Technologies of Siegen, Germany may be used in conjunction with an IR light source. The measurement distance range of this 160×120 pixel chip is scalable based on the camera layout. Many other central-element depth cameras and associated IR sources are available today. Most central-element depth cameras include a modulated light source. The light source may use pulse modulation for direct determination of round-trip travel time. In another embodiment, the light source may use continuous wave (CW) modulation with sinusoidal or rectangular waveforms to obtain round-trip travel time based on measured phase shift.

The depth-camera 148 may also be a triangulation-based depth camera. An example of such a camera is the Kinect™ of the Microsoft Xbox™ 360 manufactured by Microsoft Corporation of Redmond, Wash., which is a different Kinect™ than the Kinect™ of the Microsoft Xbox™ One described herein above. An IR light source on the Kinect™ of the Xbox™ 360 projects a pattern of light onto an object, which is imaged by an IR camera that includes a photosensitive array. The Kinect™ determines a correspondence between the projected pattern and the image received by the photosensitive array. It uses this information in a triangulation calculation to determine the distance to object points in the measurement volume. This calculation is based partly on the baseline between the projector and the IR camera and partly on the camera pattern received and projector pattern sent out. Unlike the central-element depth camera, a triangulation camera cannot be brought arbitrarily close to the light source (pattern projector) as accuracy is reduced with decreasing baseline distance.

In an embodiment, the mobile computing device 52 includes a position/orientation sensor may include inclinometers (accelerometers), gyroscopes, magnetometers, and altimeters. Usually devices that include one or more of an inclinometer and gyroscope are referred to as an inertial measurement unit (IMU) 150. In some cases, the term IMU 150 is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices.

Figure 10:
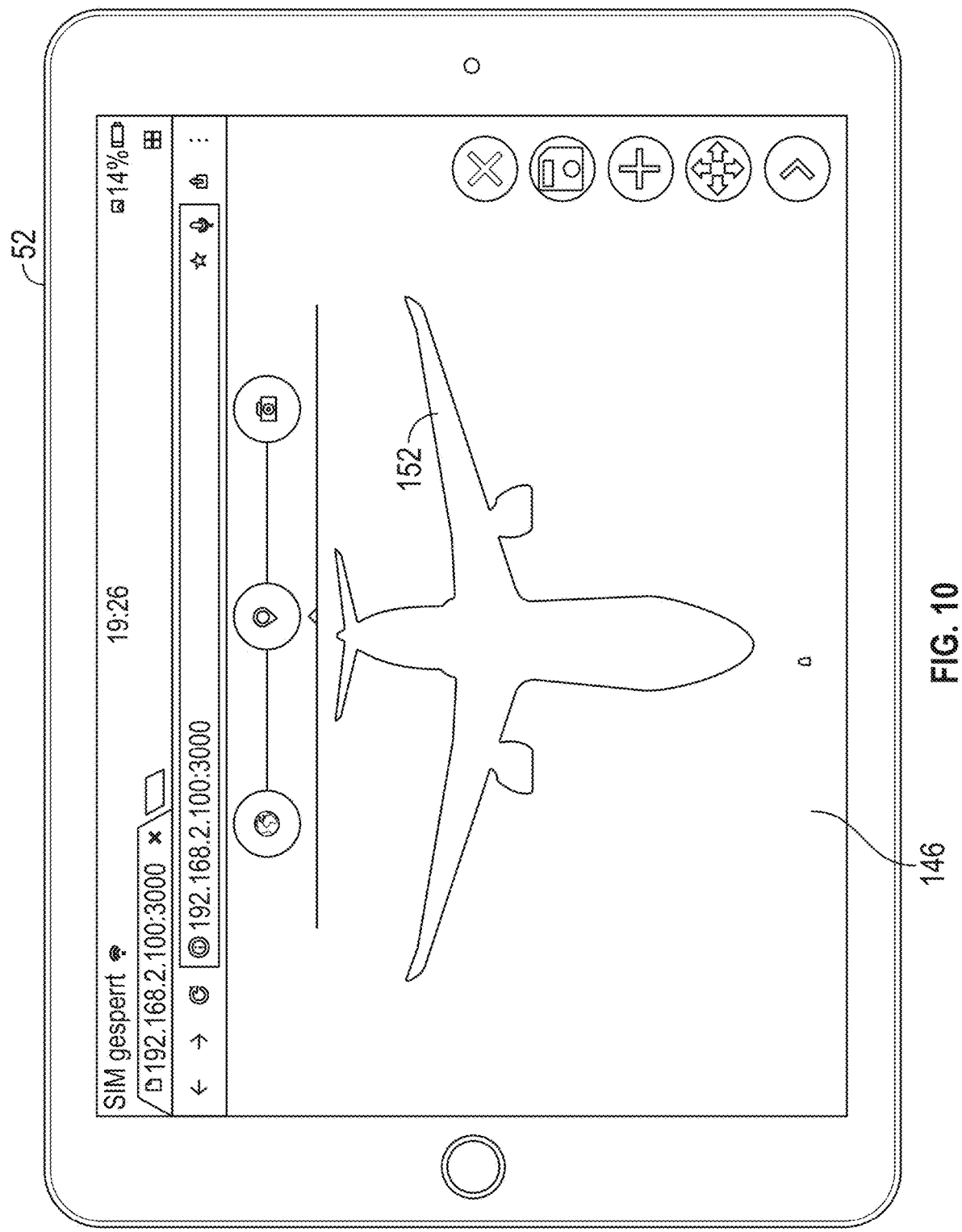
FIG. 10 and FIG. 11 illustrate a user interface for a mobile computing device used in the system of FIG. 1 according to an embodiment.
Figure 11:
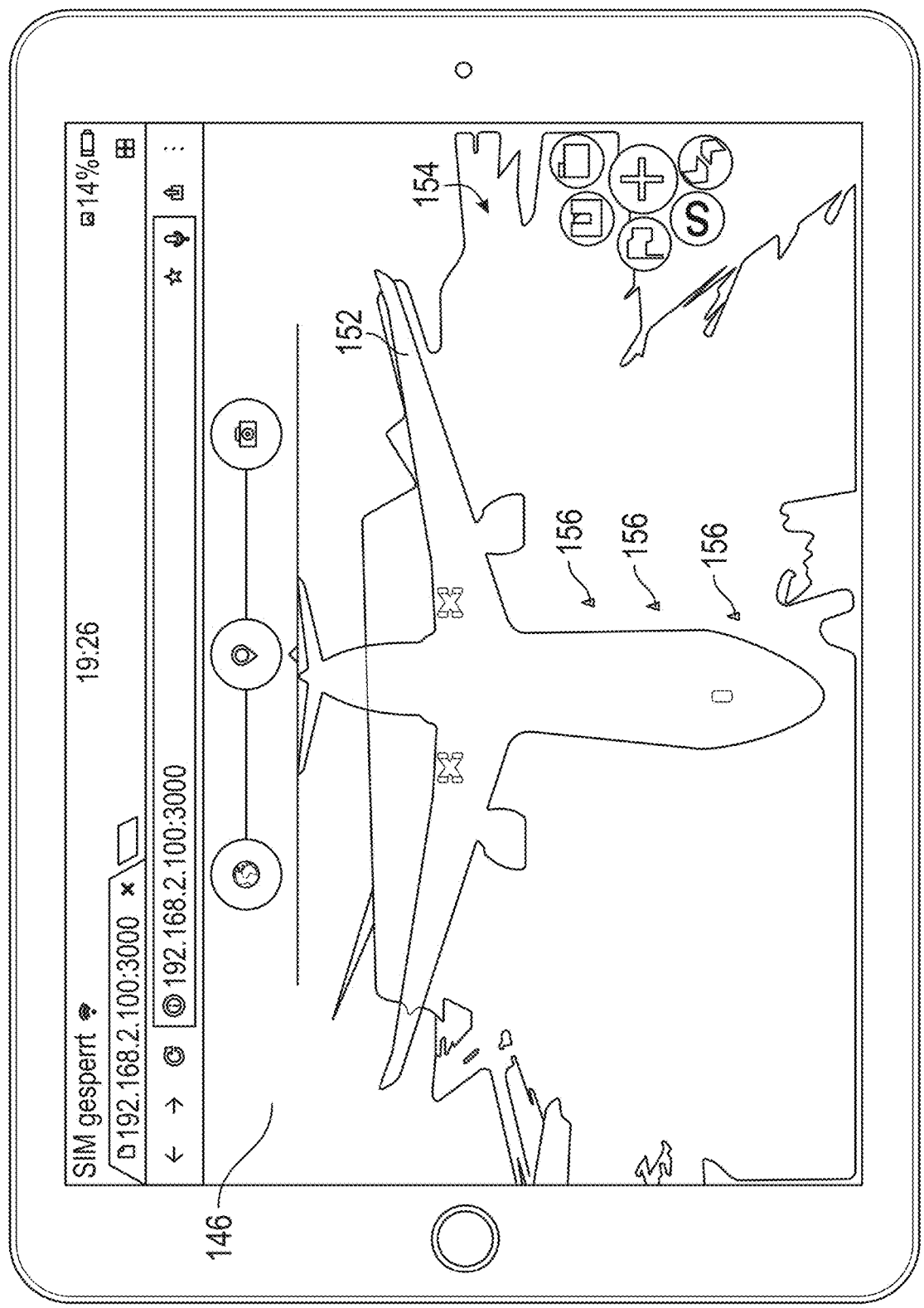

In an embodiment, the IMU may be used in cooperation with a depth camera, such as camera 148 to generate a three-dimensional map 152 of the environment in which an object 154 is located. To generate the three-dimensional map 152, the operator walks around the object 152 and acquires a plurality of images with the depth camera 148 of the object 152 and the environment in which it is located. Since the distance to surfaces in the environment may be determined from the data acquired by depth camera 148 and the movement of the mobile computing device 52 from the IMU 150, three-dimensional coordinates of the surfaces in the environment and the object 152 may be determined. In an embodiment, the three-dimensional coordinates are in a first frame of reference. The three-dimensional coordinates of the surfaces allows for the displaying of the environment and object on the user interface 146 mobile computing device 52 as shown in FIG. 10 and FIG. 11.

The ability to generate a three-dimensional map of the environment provides advantages in allowing the user to operate the system 20 on an ad hoc basis. In other words, the system 20 may be operated in environments and on objects where an a priori or predetermined information is not required, thus the system 20 provides flexibility the inspection of objects. Further, the three-dimensional map 154 provides advantages in allowing the operator to selectively define locations 156 (FIG. 11) in the environment where the operator would like scans by three-dimensional measurement device 28 to be performed. Thus, the operator can define the parameters of the scan (location of scans and path of the mobile measurement system 24) and transfer the parameters to the mobile measurement system 24. Once the scans are performed by the measurement system 24, a point cloud of the object 152 is generated.

It should be appreciated that while embodiments herein show the object 152 as being scanned by the measurement system 24, this is for exemplary purposes and the claims should not be so limited. In other embodiments, the 3D measurement device 28 may be mounted to other carriers or platforms, such as a movable crane or gantry that allows the top surfaces of the object 152 (e.g. the top of an airplane) to be scanned and a point cloud generated. It should also be appreciated that the surface analysis described herein does not require the different scans to be registered in a common frame of reference.

Figure 12:
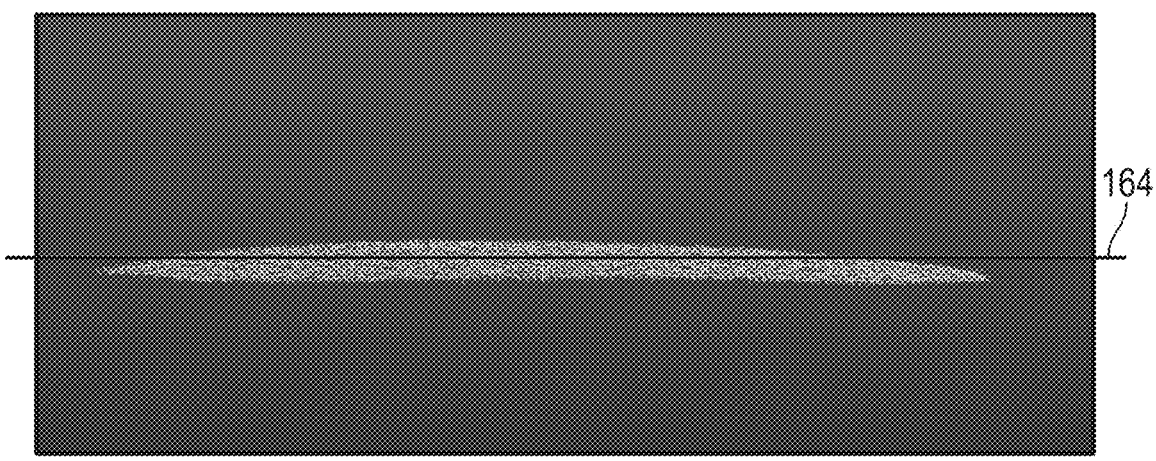
FIG. 12 is an illustration of a plane fit through an area of interest according to an embodiment.
Figure 13:
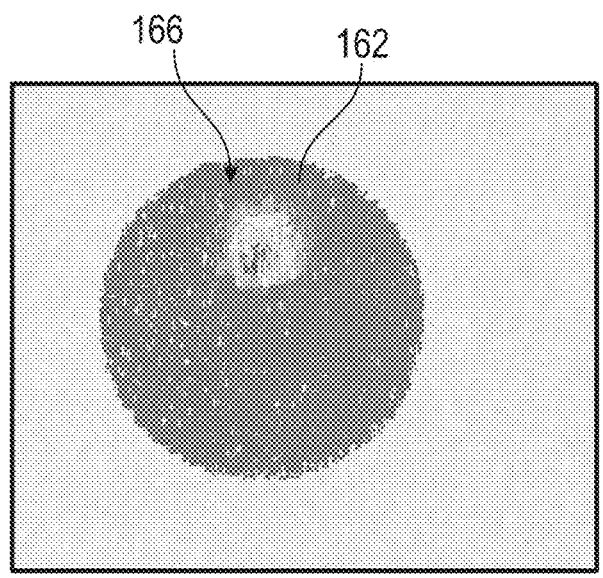
FIG. 13 and FIG. 14 are an illustration of a portion of the area of interest of FIG. 12 according to an embodiment.

Referring now to FIGS. 12-17 an embodiment of performing a surface analysis on the object 152 is shown. Once the point cloud is generated, an inspection module segments the scans into a set of surfaces, such as segment 160 (FIG. 15) for example, based on edges of the objects. In an embodiment, segments of scans are defined with no sharp edges, to avoid biasing the surface analysis. Once the segments 160 are defined, the surface is analyzed by extracting small areas of interest 162 (FIG. 13 and FIG. 14) of each segment 160. When it is desired to inspect for dents and bumps, the sliding window is shaped like a circle, as shown in FIG. 13. This process is repeated iteratively until the whole segment 160 is fully covered.

Figure 14:
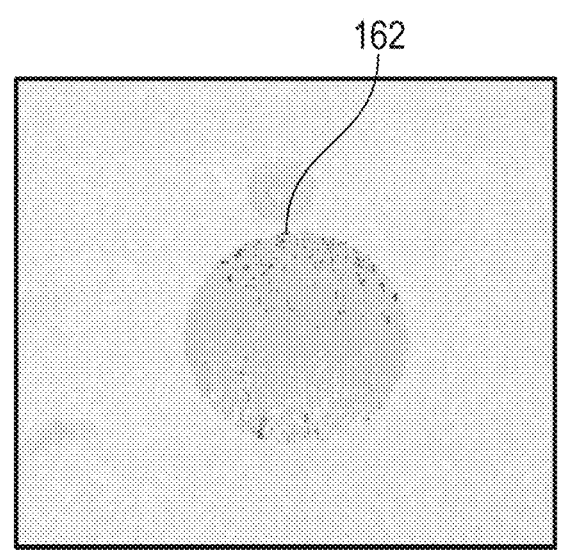
Figure 15:
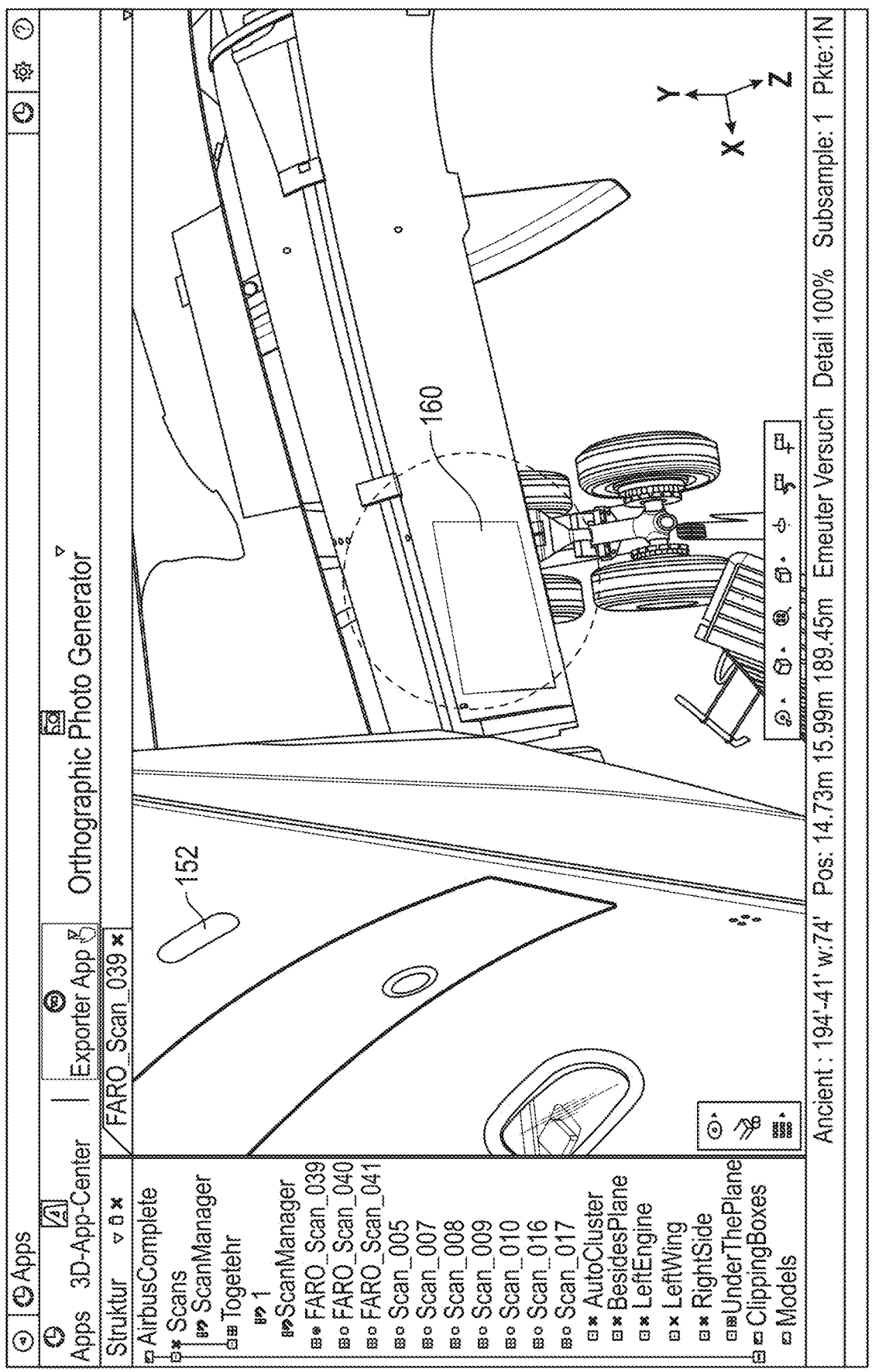
FIG. 15 is an illustration of a user interface illustrating an area of interest on an object being measured according to an embodiment.
Figure 16:
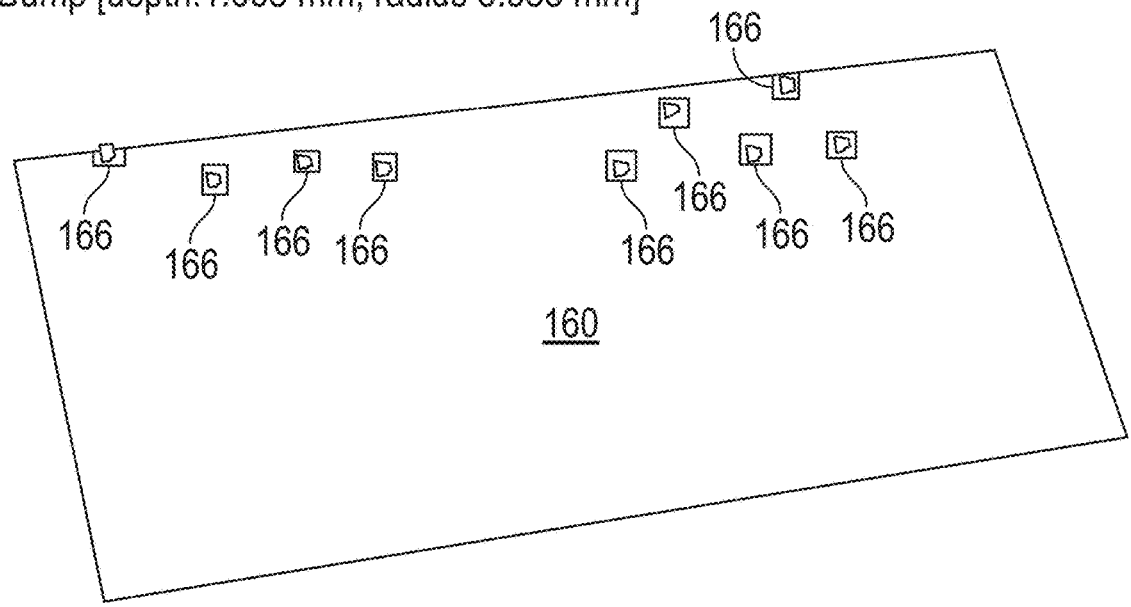
FIG. 16 is another illustration of a user interface illustrating an area of interest on an object being measured according to an embodiment.

Next, the inspection module splits the surfaces into smaller geometrical structures/identities or reference geometries, such as planes, curved surfaces, three-dimensional splines, and other shapes for example (e.g. by applying plane fitting to identify the surfaces as shown in FIG. 12). In an embodiment, the plane 164, is a best fit for all of the points in the area of interest 162. With the plane 164 fit to the area of interest 162, a metric, such as but not limited to: the distances between the points and the reference geometry, surface normal from the reference geometry, average/covariance of the distances of window-points to the reference geometry, distribution of the distances (e.g. a region within the window with a large number points deeper than a threshold), ratios of the average/covariance of the distance for two subareas within a window (e.g. the window is subdivided and the average/covariance distances are compared, if the values are within a predetermined range of each other, then no dent, otherwise the area is marked as a dent), root-mean-square-error (RMSE) values of all the points compared against the reference geometry (RMSE greater than a threshold is marked as a dent), distribution of normal from the reference geometry, and an analysis of the extreme points (e.g. maximum or minimum) inside of the window. In the exemplary embodiment, the metric is a distance between each point and the plane. In an embodiment, this distance is determined along a vector normal to the plane. This allows for the identification of bumps (e.g. projections) or dents (e.g. recesses) on the surface. If these distances are approximately uniform as is shown in FIG. 14, meaning no peaks are identified, then the surface is marked as damage-free. However, if there is a variation, a bump or projection 166 may be identified. In an embodiment, in addition to the comparison of the variation with a pre-determined threshold, a statistical analysis of all the aforementioned metrics may be performed, and then the area is marked as having damage. As shown in FIG. 16, these identified bumps or projections 166 may then be displayed for the operator.

Figure 17:
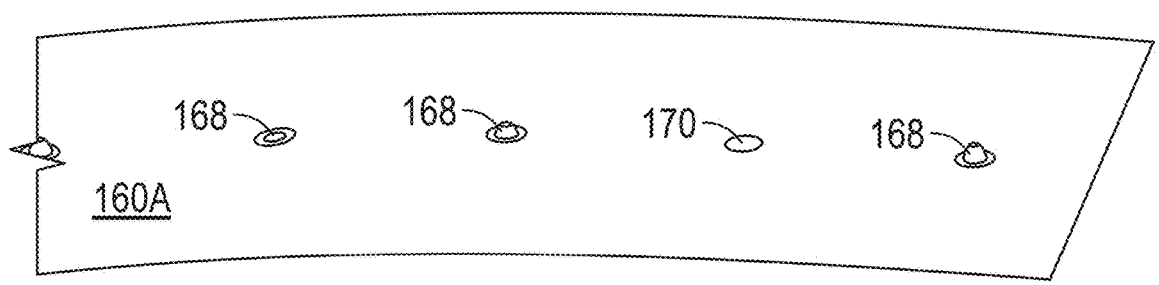
FIG. 17 is an illustration of a point cloud of the area of interest on the object according to an embodiment.

It should be appreciated that the above method may be used for inspection for additional items of interest in addition to bumps and dents. Referring to FIG. 17, an embodiment is shown of a segment 160A having a plurality of fasteners 168. It should be appreciated that an operator of an object such as an airplane may desire to confirm that all of the fasteners that couple a panel to a body are present. It should be appreciated that where a fastener is missing, a hole will be present in the segment 160A, such as hole 170. The hole 170 will represent a large deviation from the plane 164. As a result, embodiments of the disclosed method may identify missing parts, misassembled parts and other structural elements that deviate from the surrounding areas. It should be appreciated that in an embodiment, the inspection module may identify repetitive patterns (e.g. a line of fasteners) and where the pattern is disrupted, the area may be identified for further inspection. In this embodiment, the identification of fasteners with a missing head portion may be identified.

It should be appreciated that this method provides advantages over traditional methods that used CAD models or create a reference point cloud for comparison. In some embodiments (e.g. automobile damage insurance claim inspections), these reference models may not be available as they are proprietary to the original manufacturer of the object. Further, the method of the embodiments described herein also work on very large objects (e.g. airplanes or ships) where the reference models may not be available or may include deviations that are large due to build tolerances.

It should be appreciated that while embodiments herein may refer to the mobile computing device 52 as being a cellular phone or a tablet type computer, this is for exemplary purposes and the claims should not be so limited. In other embodiments, the mobile computing device 52 may be any type of computing device that is portable and configurable to execute the functions described herein. The mobile computing device 52 may be, but is not limited to a cellular phone, a tablet computer, a laptop computer, a personal digital assistant, a special-purpose computer, a wearable computer, or a combination thereof.

Figure 18:
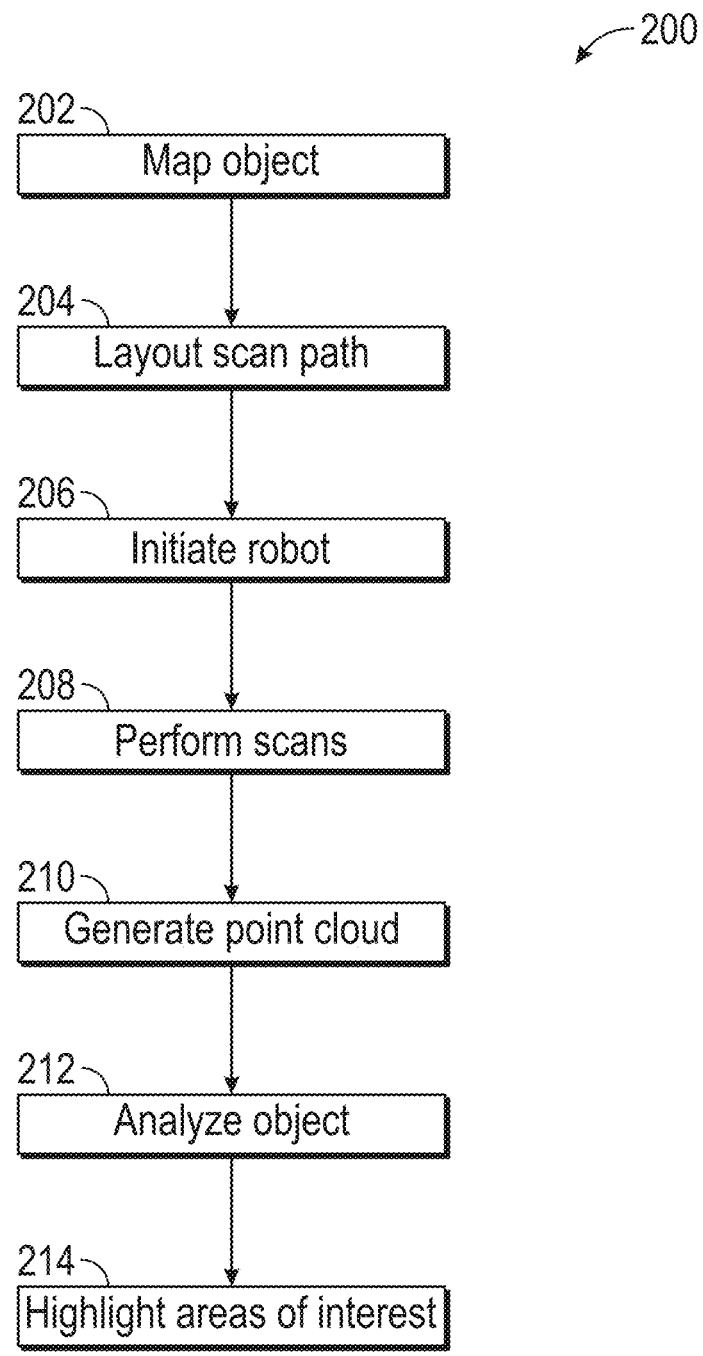
FIG. 18 illustrates a flow diagram of a method of operating the system of FIG. 1.

Referring now to FIG. 18, a method 200 is disclosed for performing a surface inspection of an object. The method 200 starts in block 202 where the object 152 or the environment in which the object 152 is located are mapped. In an embodiment, the mapping is performed by acquiring a plurality of images using the depth camera 148 and monitoring the position of the mobile computing device 52 with the IMU 150. The method 200 then proceeds to block 204 where the map 154 of the object 152 and the environment are displayed on the user interface 146 of the mobile computing device 52. In an embodiment, the object 152 may be flattened into a two dimensional representation or represented as a shadow over the environment (e.g. the floor). This may occur with objects, such as airplanes, where the mobile measurement system 24 can move under the object and to simplify the display for the operator of the mobile computing device 52.

In block 204, the operator may indicate locations 156 where scans are to be performed. In an embodiment, the operator may also indicate a path or route the mobile measurement system 24 is to travel. The method 200 then proceeds to block 206 where the scan location data or routing/path data are transferred to the mobile measurement system 24 and the operation of the mobile platform 26 is initiated. The mobile platform 26 moves along a path to the first location 156. In one embodiment, the mobile platform 26 is an autonomous unit that travels along an arbitrary path according to predetermined rules. In another embodiment, the mobile platform 26 moves along a predetermined path indicated by the operator in block 204.

Once the mobile platform 26 reaches the first location 156, the mobile platform 26 stops and the method proceeds to block 208. In an embodiment, the wheels 32 of the mobile platform 26 may be located in place during a scan. In another embodiment, the wheels 32 are retractable. At the location 156, the measurement device 28 initiates operation as described herein. The measurement device 28 acquires three-dimensional coordinates of points on the surfaces of the object 152. It should be appreciated that in an embodiment where the measurement device 28 is mounted to a scissor lift 68, the height of the measurement device 28 relative to the floor may be changed prior to initiating operation. If the operator identified additional locations 156 for scans, the mobile platform 26 moves once the scan is completed by the measurement device 28 to the next location. This continues until all scans have been performed at all locations 156 defined by the operator.

The method 200 then proceeds to block 210 where the point cloud is generated. Next, the surfaces of the object 152 are analyzed in block 212. As described herein, the analysis of the surfaces includes determining segments 160; determining areas of interest 162 for each segment; identifying geometrical structures on the segment; and determining the distance from each of the points in the area of interest to the identified geometrical structure (e.g. planes, curved surface, etc.). The method 200 then proceeds to block 214 where areas of interest with potential anomalies (e.g. bumps and dents) are highlighted on a display for the operator. It should be appreciated that the analyzing of the object and highlighting anomalies may be performed on the measurement device 28, the mobile computing device 52, a remote computer, a service in the cloud or a combination of the foregoing.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of analyzing a surface of an object, the method comprising:
   performing a scan of the object with a 3D measurement device, the 3D measurement device being operable to measure 3D coordinates for a plurality of points on the surface;
   generating a point cloud from the 3D coordinates of the plurality of points;
   extracting a first set of points from the plurality of points;
   defining a first reference geometry through the first set of points;
   measuring at least one first metric from each of the points in the first set of points to the first reference geometry;
   identifying a repetitive pattern; and
   identifying a nonconforming feature based at least in part on the at least one first metric and the repetitive pattern.

2. The method of claim 1, further comprising segmenting surfaces in the point cloud into a set of surfaces based on edges of the object.

3. The method of claim 1, wherein the at least one first metric is a surface normal from the first reference geometry.

4. The method of claim 1, wherein the at least one first metric is a ratio of the average of distances for two subareas within a window of window-points, wherein the window-points are defined based on a depth relative to a threshold.

5. The method of claim 1, wherein the at least one first metric is a root-mean-square-error value for each of the points compared against the first reference geometry.

6. The method of claim 1, wherein the identified nonconforming feature is at least one of a dent, a bump or a missing fastener.

7. The method of claim 6, further comprising:
   displaying the point cloud on a user interface; and
   changing a color of the point cloud at a location of the nonconforming feature.

8. The method of claim 1, wherein the at least one first metric is a distance from a plane to each of the points in the first set of points.

9. The method of claim 8, wherein the distance is determined along a vector normal to the plane.

10. A method of analyzing a surface of an object, the method comprising:
    performing a scan of the object with a 3D measurement device, the 3D measurement device being operable to measure 3D coordinates for a plurality of points on the surface;
    generating a point cloud from the 3D coordinates of the plurality of points;
    extracting a first set of points from the plurality of points;
    defining a first reference geometry through the first set of points;
    measuring at least one first metric from each of the points in the first set of points to the first reference geometry;
    identifying a repetitive pattern on the first reference geometry;
    identifying a nonconforming feature based at least in part on the at least one first metric and the repetitive pattern;
    segmenting surfaces in the point cloud into a set of surfaces based on edges of the object;
    defining an area of interest, the first set of points being disposed within the area of interest; and
    moving the area of interest over each surface in the set of surfaces, wherein for each movement of the area of interest a second set of points is extracted from the plurality of points, a second reference geometry is fit through the second set of points, a second metric is measured from each of the points in the second set of points to the reference geometry, and a nonconforming feature is identified based at least in part on the second metric.

11. The method of claim 10, further comprising:
moving the 3D measurement device about the object; and
performing a plurality of scans as the 3D measurement device is moved about the object.

12. The method of claim 11, wherein the 3D measurement device is moved by an autonomous mobile platform.

13. The method of claim 12, further comprising:
displaying a graphical representation of the object on a user interface;
identifying locations to perform each of the plurality of scans relative to the object in response to an input from an operator; and
transmitting the locations to the autonomous mobile platform.

14. The method of claim 13, further comprising:
acquiring a plurality of images using a 3D camera, each of the plurality of images including depth information; and
generating the graphical representation of the object based at least in part on the plurality of images.

15. A method of analyzing a surface of an object, the method comprising:
performing a scan of the object with a 3D measurement device, the 3D measurement device being operable to measure 3D coordinates for a plurality of points on the surface;
generating a point cloud from the 3D coordinates of the plurality of points;
extracting a first set of points from the plurality of points;
defining a first reference geometry through the first set of points;
measuring at least one first metric from each of the points in the first set of points to the first reference geometry, wherein the at least one first metric is an average of distances of window-points to the first reference geometry, wherein the window-points are defined based on a depth relative to a threshold;
identifying a repetitive pattern; and
identifying a nonconforming feature based at least in part on the at least one first metric and the repetitive pattern.

* * * * *